J. B. Cornell.
Window Shutter.

No. 19,348. Patented Feb. 16, 1868.

UNITED STATES PATENT OFFICE.

JOHN B. CORNELL, OF NEW YORK, N. Y.

METALLIC WINDOW-SHUTTER.

Specification of Letters Patent No. 19,348, dated February 16, 1858.

*To all whom it may concern:*

Figure 3:
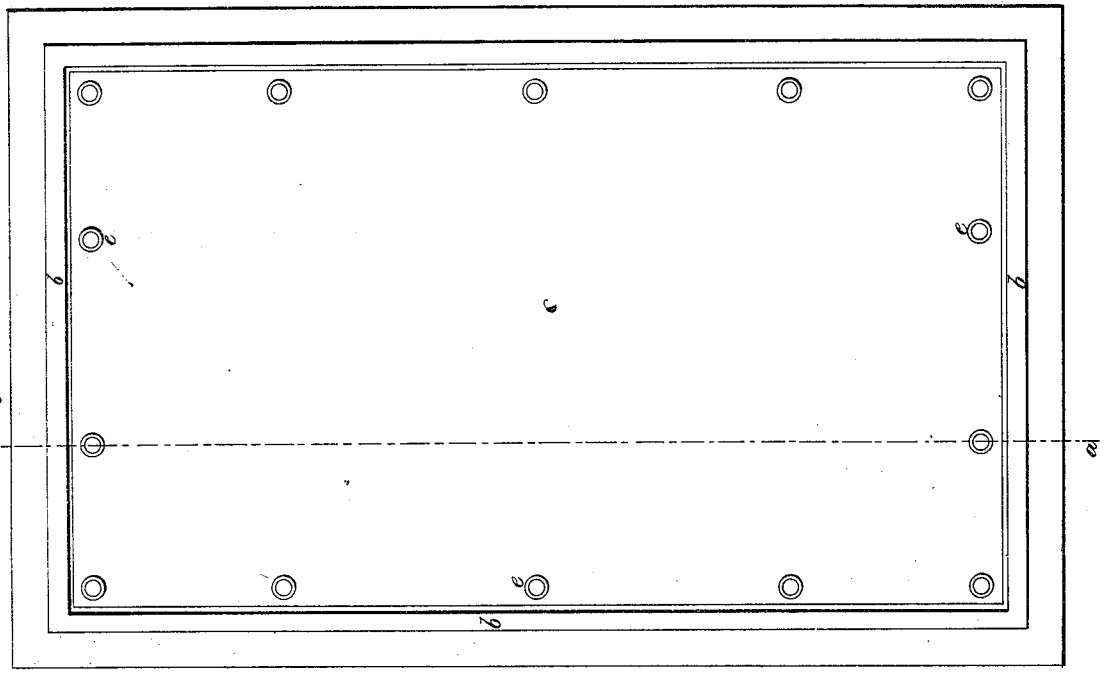
Figure 2:
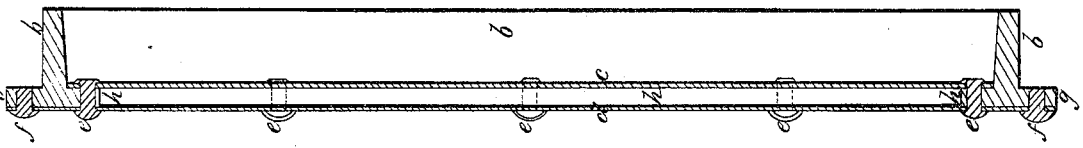
Figure 1:
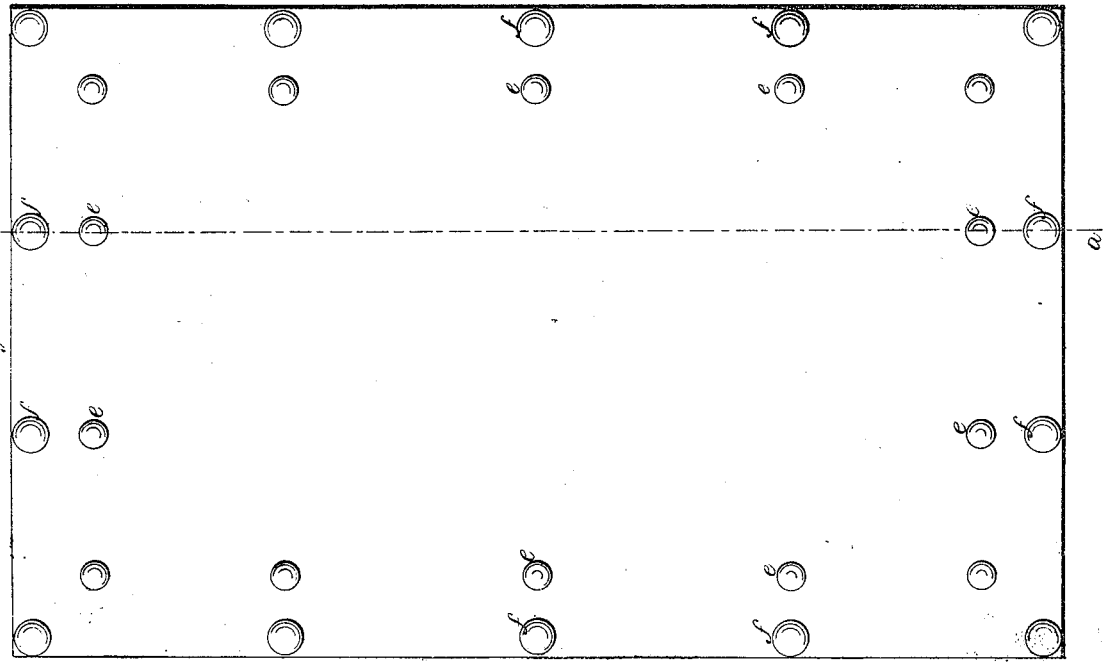

Be it known that I, JOHN B. CORNELL, of the city, county, and State of New York, have invented an Improved Fireproof Metallic Window-Shutter; and I do hereby declare that the following is a full and exact description thereof, reference being had to the accompanying drawings, making a part of this specification, Figures 1 and 2 being views of opposite sides of said shutter and Fig. 3 a section in the line $a$ $a$ of Figs. 1 and 2.

Similar letters indicate like parts in each figure.

The first thing to be done in manufacturing my improved metallic shutter, is to make a frame $b$, $g$, $h$, of T-shaped iron, and then two thicknesses $c$, $d$, of sheet-iron should be combined with said frame by means of a suitable number of rivets $e$, $f$, substantially as shown in the drawings.

The border of the outer sheet-iron casing $d$, of my improved shutter, should be trimmed off even with the edge of the outer flanch $g$, of the frame of the shutter, and the inner sheet-iron casing $c$, of said shutter, should be fitted within the portion $b$, of said frame and should rest upon the inner flanch $h$, thereof; then, the inner series of rivets $e$, $e$, passing through both casings and also through the inner flanch $h$, of the frame, of the shutter, and the outer series of rivets $f$, $f$, passing through the border of the outer casing $d$, and through the outer flanch $g$, of the frame of the shutter, will firmly unite the respective parts of my improved shutter to each other.

My improved metallic shutter clearly possesses the following advantages: to wit.

In the first place the shank $b$, of the T-shaped bar of which the frame of said shutter is composed, will shut into the rabbet of the window frame so far as to render it impossible for the shutter to be pried out of its frame by the most expert burglar. Second, a frame composed of T-shaped iron must necessarily be much stiffer, than a frame, of the same weight, made of square or flat-shaped bar-iron. Third, the inner casing $c$, of said shutter, being fitted accurately within the central shank $b$, of the bar which composes the frame thereof, and being, by the same series of rivets, combined with the outer casing $d$, of the shutter and with the inner flanch $h$, of its frame, while the outer edge of the outer casing of the shutter is combined with the outer flanch $g$, of its frame; by means of another series of rivets, it is self-evident that a degree of heat which would injuriously warp a shutter whose frame was composed of flat or square bars of iron, would not exert any injurious effect upon my improved shutter.

The within described method of constructing metallic window-shutters, is equally applicable to the construction of metallic doors, panels, or partitions.

What I claim as my invention and desire to secure by Letters Patent, is—

Constructing metallic shutters, doors, &c., of double casings of sheet metal combined with a frame composed of T-shaped metallic bars, substantially as herein set forth.

JOHN B. CORNELL.

Witnesses:
Jos. W. MAUTERSTOCK,
THOS. CROCKER.